(No Model.)
A. H. MAYNARD.
TOOL HANDLE.
No. 460,544. Patented Sept. 29, 1891.
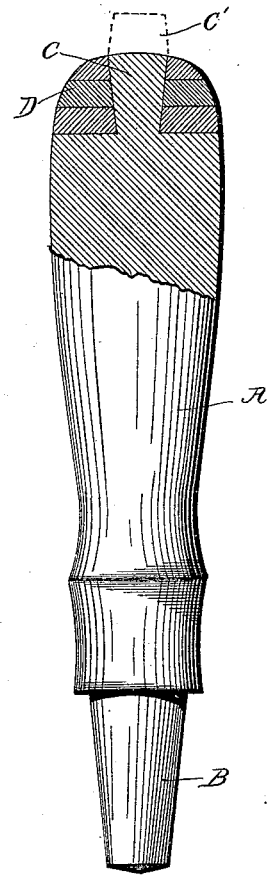
Witnesses
Walter S. Bowen
James J. Rafferty
Inventor
A. H. Maynard.
By his Attorney
Louis W. Southgate
THE NORRIS PETERS CO., PHOTO-LITHO., WASHINGTON, D. C.

UNITED STATES PATENT OFFICE.

ALFRED H. MAYNARD, OF WORCESTER, MASSACHUSETTS, ASSIGNOR TO HIMSELF AND CHARLES B. MAYNARD, OF SAME PLACE.

TOOL-HANDLE.

SPECIFICATION forming part of Letters Patent No. 460,544, dated September 29, 1891.

Application filed March 30, 1891. Serial No. 386,938. (No model.)

*To all whom it may concern:*

Be it known that I, ALFRED H. MAYNARD, a citizen of the United States, residing at Worcester, in the county of Worcester and State of Massachusetts, have invented a new and useful Improvement in Tool-Handles, of which the following is a specification.

The aim of this invention is to produce a new and improved tool-handle; and to this end the same consists of the device described and claimed in this specification and illustrated in the accompanying drawing, in which the figure is an elevation, partly in section, of one form of handle embodying my invention.

In detail, A represents a handle of any approved shape. The same may have a tapered shank B, if so desired, for engaging the tool that the same is to be used in connection with. A bolster may of course be used to hold the tool in place, and the bolster in this case would be slipped on the shank B.

The top of the handle is turned away so as to leave the inwardly-tapered spindle C, which is thus dovetailed in section, and on which are placed one or more washers, preferably of leather. If leather washers are to be used, the manner or method in which the same are applied is as follows:

The handle is first roughly turned, and the spindle is turned longer than the finished article by the portion C'. (Shown in dotted lines.) This portion C' is tapered the other way from the spindle C, so that the washers may be readily slipped on the spindle. The leather washers are so cut that the same will fit the spindle tightly, and are then preferably moistened in water and are then dipped in glue. Of course the dipping in glue by itself would be sufficient to expand the same, so that they will readily go on the spindle. The washer or washers are then forced on the spindle C. Then, when in place, they are allowed to dry, and thus to contract in place, and in that manner and by reason of the paper of the spindle C they will be firmly held in place. The handle and also the washers, if so desired, are then turned off smooth and finished, and the part C' of the spindle is cut off, thus producing the finished article. By this method of applying the washer or washers it has been found by practical test that the same are held most firmly in place as the handle is worn up by actual use.

The shape of the handle is immaterial, so far as the purpose of my invention is concerned, and the same may be used in connection with awls, chisels, &c.

It is evident, of course, that a rubber washer or washers can be used on the tapered spindle and simply slipped on over the taper.

Modifications of my invention may be made by a skilled mechanic without departing from the scope of my invention.

Having thus fully described my invention, what I claim, and desire to secure by Letters Patent, is—

1. A handle of any desired shape, having the inwardly-tapered spindle C, substantially a dovetail in section, and one or more washers held by said spindle C, substantially as described.

2. The method of making a tool-handle, which consists in forming the handle with an inwardly-tapered spindle, slipping or forcing one or more leather washers on said spindle, said washers being first moistened, and then allowing the same to dry, and thus to contract in place, substantially as described.

3. The method of making a tool-handle, the same consisting in roughly turning the handle with a tapered spindle, slipping or forcing one or more leather washers on the spindle, said washers being first moistened, allowing the same to dry and thus contract in place, and then finishing or turning off the handle, substantially as described.

4. The blank for tool-handles, consisting of the handle having the inwardly-tapered spindle C, said spindle having the reversely-tapered portion C', and the shank B, formed on the other end of the handle, to which the tool or bolster may be fastened, substantially as described.

In testimony whereof I have hereunto set my hand in the presence of two subscribing witnesses.

ALFRED H. MAYNARD.

Witnesses:
LOUIS W. SOUTHGATE,
F. A. HATCH.